Oct. 22, 1946.　　　R. R. CURTIS　　　2,409,975
PUMP PRESSURE CONTROL SYSTEM
Filed March 6, 1943
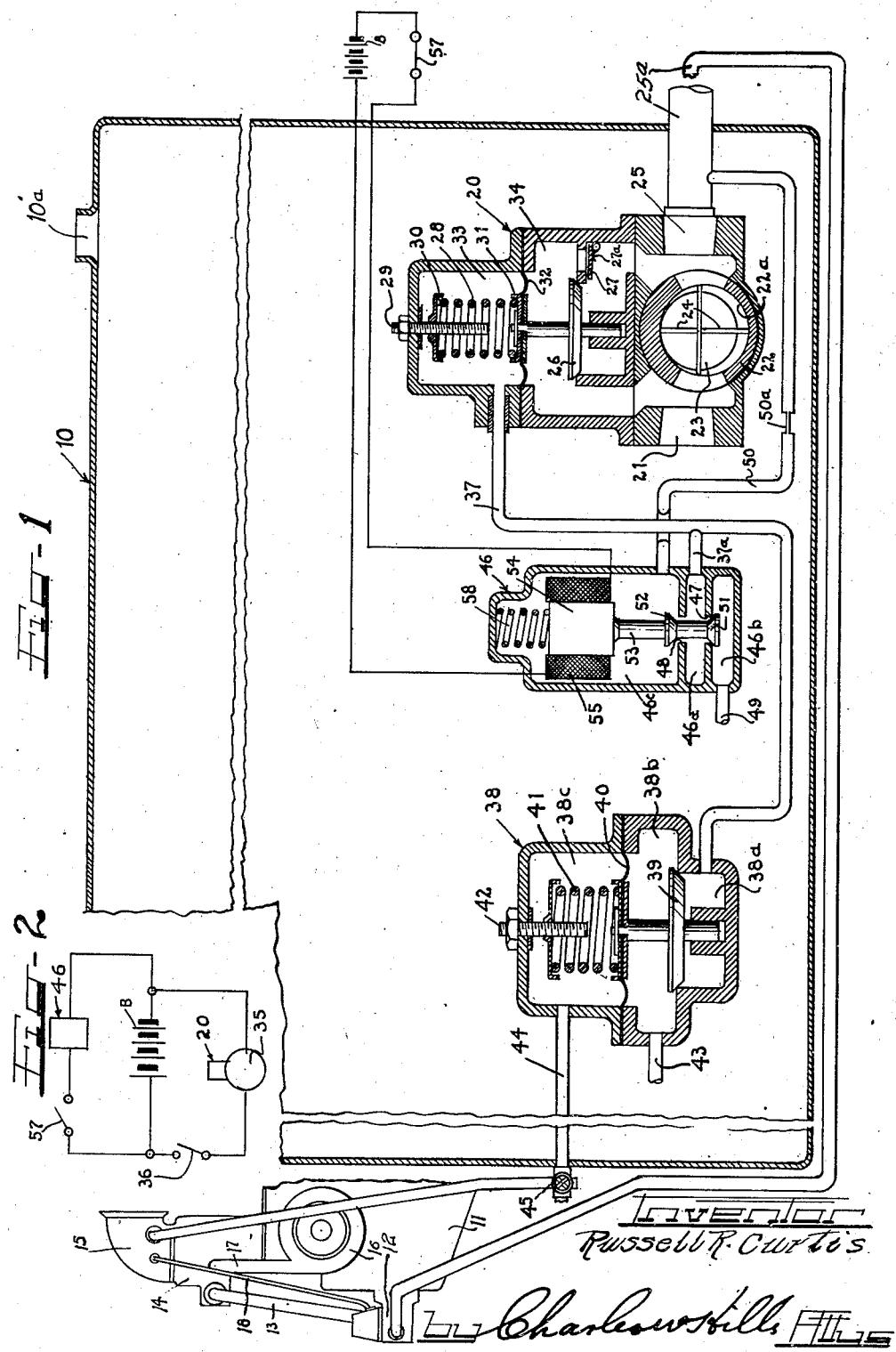
Inventor
Russell R. Curtis
by Charles W. Hills Patented Oct. 22, 1946

2,409,975

UNITED STATES PATENT OFFICE 2,409,975

PUMP PRESSURE CONTROL SYSTEM

Russell R. Curtis, Dayton, Ohio, assignor to Curtis Pump Company, Dayton, Ohio, a corporation of Ohio Application March 6, 1943, Serial No. 478,213

10 Claims. (Cl. 103—42)

This invention relates to the maintenance of selected pump pressure differentials above selected base pressures.

Specifically the invention relates to the control of pump discharge pressures by a first balanced relief valve assembly subjected to pump pressure on one side and base pressure on the other side, together with a positively-controlled valve for subjecting the balanced relief valve assembly to pump discharge pressure instead of said base pressure, and a second relief valve assembly for limiting the effect of pump pressure on said first relief valve assembly, whereby the pump can deliver fluid under selected constant pressure differentials based on the same or different base pressures.

This invention is especially applicable to aircraft fuel systems and will hereinafter be described as embodied in such systems, although it should be understood that the invention is not limited to aircraft usage.

According to this invention, a fuel pump with a balanced relief valve assembly is mounted in an airplane fuel tank to receive fuel therefrom and deliver the fuel under pressure through a fuel line to a second fuel pump driven by the airplane engine. The fuel pump in the tank is preferably driven by an electric motor.

The fuel pump in the tank is equipped with a spring-urged relief valve set to maintain a desired pressure on the discharge side of the pump, in the order of seven or eight pounds per square inch. Such pressures will prevent liberation of gases and vapors in the fuel line. In order to maintain a constant pressure differential in the discharge side of the fuel pump, determined solely by the spring pressure exerted on the relief valve of this pump, a diaphragm is provided in the relief valve assembly which is subjected to pump pressure on one side and base pressure on the other side during normal operation. The base pressure is preferably that pressure existing in the tank in which the fuel pump is mounted.

Under emergency conditions, as, for example, in high altitude flying, and in case of damage to the engine-driven fuel pump, it is desirable to maintain a higher pressure differential on the discharge side of the pump mounted in the tank. For this purpose, the discharge side of the pump is joined with a positively-controlled valve such as a solenoid-operated valve. When this valve is actuated it will subject both sides of the relief valve to pump discharge pressures instead of subjecting one side to pump discharge pressure and the other side to base pressure as in normal operation. A second relief valve is also provided to limit the pump discharge pressure effect on the balancing means of the pump relief valve. This second relief valve is subjected to base pressure on one side and pump discharge pressure on the other side. A spring in this second relief valve will determine the pressure differential maintained by the pump under emergency duty performance.

The system of this invention thus provides for the maintenance of selected pump pressure differentials based on the same or different base pressures. For example, the balancing means of the pump relief valve can be subjected to a base pressure such as exists in the fuel tank, while the second relief valve can be subjected to a base pressure such as exists in the fuel tank, or the supercharger pressure of the airplane engine being supplied by the pump.

It is, then, an object of this invention to provide an assembly for maintaining selected pressure differentials based on the same or different base pressures.

A further object of the invention is to provide a pump assembly having a balanced relief valve with a relief valve control system so that the pump can maintain different selected discharge pressures.

A still further object of the invention is to provide an aircraft fuel system capable of delivering a constant normal fuel pressure differential above a base pressure as well as a constant increased emergency fuel pressure differential above a base pressure.

A still further object of the invention is to provide, in an aircraft fuel system having a plurality of fuel pumps in series or tandem arrangement, a relief valve arrangement for at least one of said pumps capable of automatically maintaining different selected fuel pressures.

Another object is to provide a positive displacement type booster pump for a fuel system with a relief valve assembly that can be selectively controlled to maintain a selected constant pressure differential on the discharge side of the booster pump above a selected base pressure.

A still further object of this invention is to provide, in an aircraft fuel system of the booster pump-engine-driven fuel pump type, a positive-displacement booster pump having a balanced relief valve assembly capable of maintaining an increased pressure above tank pressure on the intake side of the engine-driven fuel pump during normal operation, and capable of maintaining a higher controlled pressure during emergency operation.

Other and further objects of the invention will be apparent to those skilled in the art from the following detailed description of the annexed sheet of drawings which, by way of preferred example only, illustrate one embodiment of the invention.

On the drawing:

Figure 1 is a broken vertical cross-sectional view of an airplane fuel tank having mounted therein apparatus according to this invention and also showing, in side elevation, a portion of the aircraft engine receiving fuel from the tank.

Figure 2 is a wiring diagram for the apparatus shown in Figure 1.

As shown on the drawing:

In Figure 1 the reference numeral 10 indicates generally an airplane fuel tank vented to the atmosphere as at 10a. An airplane engine 11 is equipped with an engine-driven fuel pump 12 for supplying fuel under pressure through a discharge line 13 to a fuel and air mixing device such as a carburetor 14 for the engine 11. The carburetor 14 discharges, as is customary, into the intake manifold 15 of the engine 11.

A turbo-supercharger 16 discharges air under pressure through a pipe 17 to the carburetor 14. The fuel pump 12 includes a balanced relief valve assembly therein (not shown) subjected to the pressure in the intake manifold 15 through a line 18. Alternatively, of course, the line 18 could communicate with the discharge tube 17 of the supercharger 16.

In accordance with this invention, a positive-displacement type booster pump 20 is mounted in the bottom of the fuel tank 10 to receive fuel directly from the tank. The pump 20 has an inlet 21 communicating with the bottom of the tank, so that fuel in the tank will drain directly into the pump with a minimum of restriction. The drawing illustrates the inlet 21 to be somewhat elevated above the bottom of the tank. It should be understood that, in actual installations, the inlet 21 will communicate with the very bottom of the tank and the elevated position of the pump 20 in the tank has been illustrated merely for the purpose of convenience in illustration of the various tubes in the system.

The particular pump 20 illustrated is of the sliding-vane type including a sleeve 22 defining a pump bore 22a with its inner surface and receiving therein a rotor 23 carrying a plurality of sliding vanes 24 for acting on the pump bore 22a to propel fuel from the inlet 21 to the outlet 25 of the pump. This outlet 25 is connected through a pipe or tube 25a with the intake side of the engine-driven fuel pump 12.

The discharge side 25 of the pump 20 is adapted to communicate with the intake side 21 of the pump through a relief valve 26 to relieve excess pump pressures. The intake side 21 of the pump is connected to the discharge side 25 of the pump through a by-pass valve 27 to by-pass fuel around the pumping element, in the event that the pump does not supply sufficient fuel to the intake of the pump 12. The by-pass valve 27 is held in closed position by a light spring 27a.

The relief valve 26 is urged to closed position by means of a coiled spring 28 mounted in a casing.

The compression of the spring 28 can be adjusted by means of a control screw 29 which operates a top retainer 30 for the spring, to move this retainer toward and away from a bottom retainer 31 for the spring.

In order that the pressure of spring 28 will be the sole determining factor for the amount of fluid relieved from the discharge side of the pump, a pressure-balancing flexible diaphragm 32 is provided. This diaphragm 32 can be composed of synthetic rubber-impregnated flexible fabric. The diaphragm 32 separates a chamber 33 in the casing housing the spring 28 from a chamber 34 in the pump housing the relief valve 26. The diaphragm has the central portion thereof fixed to the relief valve 26 to move therewith, while the peripheral portion of the diaphragm can be clamped between casing sections of the pump.

The bottom of the diaphragm 32 is thus subjected to pressure in the chamber 34, while the top of the diaphragm 32 is subjected to whatever base pressure exists in the spring chamber 33.

As shown in Figure 2, the pump 20 is driven by an electric motor 35 energized from any suitable source of electric current, such as a battery B. Current to the motor 35 from the battery B is controlled by a switch 36.

During normal operation, the pump 20 pumps excessive amounts of fuel into the discharge side 25 thereof, and the relief valve 26 is opened to recirculate the excess fuel back to the intake side 21 of the pump. The pressure maintained in the discharge side 25 of the pump will be controlled by the pressure of the spring 28, since this spring urges the relief valve 26 to closed position, and the relief valve, by being subjected to pump discharge pressure on the other side thereof is, of course, urged to open position by this discharge pressure. The diaphragm 32 is arranged for co-movement with the relief valve and has an effective area on one side exposed to base pressure in the spring chamber 33 balanced by an equal valve area exposed to pump discharge pressure. In addition the area of the diaphragm 32 exposed to inlet pressure in the chamber 34 and tending to move the relief valve 26 in one direction is balanced by an equal area on the valve exposed to the chamber 34 tending to move the valve in the opposite direction.

The assembly is thus balanced against variations in inlet pressures and compensating variations in pump discharge and base pressures, so that the pump pressure will be maintained at a pressure differential above the base pressure determined solely by the spring.

The chamber 33 communicates through a tube 37 with the bottom chamber 38a of a second relief valve assembly 38. This assembly includes an intermediate chamber 38b separated from the chamber 38a by a relief valve 39, and a top chamber 38c separated from the intermediate chamber 38b by a flexible diaphragm 40 similar to the diaphragm 32. The relief valve 39 is connected to the central portion of the diaphragm 40, and is spring-urged to closed position by a coil spring 41 in the top chamber 38c. The spring 41, similar to the spring 28, can be adjustably compressed by means of an operating screw 42 so as to exert a desired pressure on the relief valve 39 through the diaphragm 40.

The chamber 38b communicates with the interior of the tank 10 through a drain line 43.

The chamber 38c communicates through a tube 44 with either the intake manifold 15 of the airplane engine 11 or with the ambient air surrounding the tank depending upon the position of a valve 45. The valve 45 is adapted to selectively connect the interior of the chamber 38c with either the ambient air or the intake manifold. Thus the chamber 38c can either be subjected to a base pressure, which is the ambient air pressure, or the engine intake manifold pressure.

The tube 37 has a branch tube 37a communicating with the middle compartment 46a of a positively-operated valve 46. The chamber 46a has a bottom port 47 joining it with a bottom chamber 46b. A port 48 joins the chamber 46a with a top chamber 46c. The chamber 46b communicates with the interior of the tank through a drain line 49. The chamber 46c is connected through a tube 50 with the fuel line 25a on the discharge side of the pump 20. The tube 50 has a restricted intermediate portion 50a to prevent excessive leakage of fuel from the line 25a into the compartment 46c, while at the same time subjecting the compartment 46c to the pressure existing in the fuel line 25a.

A valve 51 is provided for closing the port 47, and a second valve 52 is provided for closing the port 48. The valves 51 and 52 are secured on or integral with a shaft 53 and are so positioned that the port 47 is closed when the port 48 is opened and, when the port 48 is closed, the port 47 is opened.

The shaft 53 is connected to a solenoid core 54 surrounded by a solenoid coil 55. As illustrated, the coil 55 is energized from the battery B and a switch 57 in the battery circuit to the coil 55 is closed so that, as illustrated in Figure 1, the core 54 is in raised position to open the port 48 and close the port 47. A spring 58 urges the core 54 to move the valve 52 to closed position, and the valve 51 to open position, when the coil 55 is de-energized as, for example, when the switch 57 is open as shown in Figure 2.

When the solenoid coil 55 is de-energized, the chamber 33 of the pump 20 is vented to the interior of the tank 10 through the tube 37, branch 37a, open port 47, chamber 46b and drain line 49. The base pressure on the balancing mechanism for the relief valve 26 is thus that pressure existing in the tank 10. Under such operating conditions, of course, the port 48 is closed and the chamber 33 is not subjected to pump discharge pressure through the tube 50. Under these conditions, the pump will deliver fuel at a constant pressure differential above the base pressure existing in the interior of the tank depending upon the setting of the spring 28. The spring 28 is preferably set so that the fuel pressure in line 25a will be from seven to eight pounds per square inch above tank pressure. Such pressures are sufficient to prevent liberation of gas and vapor bubbles in the fuel line and only fully liquid fuel is pressured through the fuel line 25a to the intake side of the engine-driven fuel pump 12. Failure of the system through vapor lock is thus prevented.

Under emergency conditions, however, such as when the engine-driven pump 12 fails, it is desirable to deliver fuel under higher pressures to the line 25a. Unless some means were provided for changing the pressure of the spring 28 on the relief valve 26, or for adding to the effect of this spring pressure on the relief valve, the discharge pressure of the pump would remain the same.

In accordance with this invention the solenoid valve 46 is energized, as by closing the switch 57, to open the port 48 and close the port 47. This vents discharge pressure from the line 25a through the tube 50 to the chamber 46c, and thence through the port 48 into the chamber 46a, branch tube 37a, and tube 37 into the spring chamber 33. As a result pump discharge pressure is added to the spring pressure in chamber 33, and the relief valve is urged toward closed position with an added force thereby permitting the building up of pressure in the line 25a.

This pressure would build up to the maximum capacity of the pump, or rupture point of the diaphragm 32, unless some means were provided for relieving the pressure. This means is provided in the second relief valve assembly 38 which comes into effect to vent the chamber 33 to the relief valve 39 whenever the chamber 33 is not vented to the tank through the drain line 49. The relief valve 39 is adapted to be opened by pressures existing in the chamber 33 above pressures exerted on the relief valve 39 by the spring 41 and by the pressure in the compartment 38c. When opened, the valve 39 will vent the chamber 33 to the interior of the tank through the drain line 43.

The spring 41 can be set to exert any desired pressure on the valve 39 and the pressure in the chamber 38c can either be based on ambient air pressure surrounding the tank 10, or pressure in the intake manifold 15 of the engine 11. Therefore, the pressure in the chamber 33 is limited by a second relief valve mechanism which is arranged to maintain a desired constant pressure differential above a base pressure (either ambient air pressure or intake manifold pressure). Since the ambient air pressure is substantially the same as that existing in the vented tank 10, except for a slight differential due to head of fuel in the tank, the base pressure on which the pump discharge pressure differential is maintained can be the same, or different, depending upon whether or not the chamber 38c is vented to the atmosphere, or to the intake manifold pressure. In any event, the spring 41 will be the sole determining factor for maintenance of the increased pressure differential above the selected base pressure when the pump 20 is being used for emergency duty.

From the above description it will be understood that this invention provides apparatus for maintaining selected pump pressure differentials above selected base pressures including a low pump pressure differential for normal operation, and a high pump pressure differential for emergency operation. During emergency operation the engine-driven fuel pump 12 may even be inoperative and the pump 20 will be sufficient to supply fuel to the carburetor 14 to maintain operation of the engine. The pump 12 is substantially identical with the pump 20 and includes a by-pass means so that fuel from the line 25a can be by-passed around the pump into the tube 13.

If the pump 20 becomes inoperative the by-pass valve 27 is effective so that the pump 12 can always receive fuel from the tank.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. Apparatus for maintaining selected pump pressure differentials which comprises a pump having a fluid intake and a fluid discharge side, a relief valve for relieving fluid from the discharge to the intake side of the pump, spring biased diaphragm means urging the valve toward closed position for maintaining a selected pump discharge pressure, a positively operated valve for selectively subjecting said diaphragm means to pump discharge pressure to increase the relief valve closing force exerted by said means and create a different pump discharge pressure differential, and a second relief valve cooperating with said positively operating valve for limiting said effect.

2. Apparatus for maintaining selected constant pressure differentials which comprises a pump having an inlet and an outlet, a relief valve assembly for relieving fluid from the outlet to the inlet side of the pump, said assembly including pressure-balancing means subjected to an adjustable pressure on one side and the pump outlet pressure on the other side for maintaining a predetermined pressure differential between the pressure in the pump outlet and said adjustable pressure, a second valve subjected to pump outlet pressure on one side and on the other side to the pump inlet pressure, means for operating said second valve to subject said one side of the pressure-balancing means to pump outlet pressure, and a third valve including pressure-balancing means vented to the pump inlet pressure on one side and on the other side to said one side of the pressure-balancing means of the relief valve for relieving pressure on said one side of the pressure-balancing means of the relief valve when said one side is vented to pump outlet pressure whereby said second valve can be operated to select constant pressure differentials of different values.

3. Apparatus for maintaining selected pressure differentials which comprises a pump having a pressure-balanced relief valve assembly capable of being set to maintain a constant pressure differential between the two sides of the valve, means for selectively subjecting one side or both sides of the pressure-balanced relief valve to pump discharge pressure, and a second relief valve effective to vent one side of the pressure-balanced relief valve of the pump to a predetermined pressure whenever said one side of the balanced relief valve is subjected to pump discharge pressure for relieving said pump pressure.

4. A fluid pressure control apparatus comprising a fluid transfer mechanism having an intake and an outlet side, a spring-pressed relief valve adapted to relieve excess pressures from the discharge to the intake side of said mechanism, a pressure-balancing device cooperating with said valve subjected to discharge pressure on one side and ambient air pressure on the other side to cooperate with said spring for maintaining the discharge pressure at a constant pressure differential above the ambient air pressure, a positively-operated valve for subjecting the balancing device to pump discharge pressure instead of ambient air pressure, and a relief mechanism adapted to relieve excess pump pressures on said balancing device for maintaining a different constant pressure differential above the ambient pressure on the discharge side of said mechanism.

5. Pumping apparatus comprising a positive displacement pump having an inlet and an outlet, a relief valve for venting the outlet with the inlet to relieve excess pressures, means on said pump defining a spring chamber, a flexible diaphragm separating said chamber from said pump, a spring in said chamber acting on one side of said diaphragm, said relief valve acting on the other side of said diaphragm, a positively-operated valve having three chambers connected through ports, a double-acting valve head in said valve for simultaneously opening one of said ports while closing the other of said ports, means for venting one of said chambers in the valve to pressure in the spring chamber, means for venting an adjacent chamber in the valve to pump discharge pressure, means for venting the third chamber in the valve to tank pressure whereby said valve can be actuated to move the valve head for subjecting the spring chamber to tank pressure or to pump discharge pressure, and a second relief valve mechanism operative for relieving excess pump pressures from the spring chamber.

6. Pump pressure control apparatus comprising a pump having a relief valve normally subjected to pump discharge pressure on one side and a predetermined constant but adjustable pressure on the other side, and means for selectively adding pump discharge pressure to said other side of the relief valve to increase the discharge pressure to greater than said predetermined value.

7. Pump pressure control apparatus comprising a pump having a relief valve normally subjected to pump pressure on one side and ambient plus spring pressure on the other side, a solenoid operated valve for adding pump discharge pressure to said other side of the relief valve, and a second relief valve for relieving excessive pump pressures from said other side of the first mentioned relief valve.

8. A fluid pressure control apparatus comprising a pump having fluid intake and discharge sides, a pressure balanced relief valve for relieving excess pressures from the discharge side of the pump, said relief valve including an operating diaphragm having at one side a pressure chamber enclosing a spring for normally biasing said relief valve to closed position, both sides of said diaphragm being normally vented to the pressure at the intake side of said pump, a positively operated valve for connecting said pressure chamber to the discharge side of said pump to urge the relief valve toward closed position with greater force, whereby said relief valve will maintain an increased pressure differential on the discharge side of the pump, and means for relieving excess pump pressure from said relief valve whenever said positively operated valve effects said increase pressure differential.

9. A fluid pressure control apparatus comprising fluid transfer means having intake and discharge sides, a spring pressed relief valve for relieving fluid from the discharge to the intake side of said fluid discharge means, a flexible diaphragm operatively connected to said relief valve and having both the spring opposing side and the spring aiding side thereof normally exposed to a base fluid pressure, and means for selectively increasing the fluid pressure on the spring aiding side of said diaphragm to increase the discharge pressure of said transfer means.

10. A fluid pressure control apparatus comprising a pump having fluid intake and discharge sides, a relief valve in said pump for release of fuel from said discharge to said intake side of the pump, spring means urging said relief valve to its closed position, a balancing device connected to said relief valve, both sides of said balancing device being normally vented to the pressure at the intake side of said pump, whereby said relief valve maintains a constant pump discharge pressure differential above intake pressure, and means for selectively subjecting said spring aiding side of said balancing device to pump discharge pressure for increasing the pump discharge pressure differential.

RUSSELL R. CURTIS.